March 27, 1962

R. E. KIBELE 3,026,678

AIRCRAFT HYDRAULIC SYSTEM

Filed Feb. 18, 1959

INVENTOR.
ROBERT E. KIBELE
BY
ATTORNEY

Fig. 2

INVENTOR.
ROBERT E. KIBELE
ATTORNEY

March 27, 1962   R. E. KIBELE   3,026,678
AIRCRAFT HYDRAULIC SYSTEM
Filed Feb. 18, 1959   5 Sheets-Sheet 3

INVENTOR.
ROBERT E. KIBELE
BY
ATTORNEY

March 27, 1962 R. E. KIBELE 3,026,678
AIRCRAFT HYDRAULIC SYSTEM
Filed Feb. 18, 1959 5 Sheets-Sheet 4

INVENTOR.
ROBERT E. KIBELE
BY
ATTORNEY

March 27, 1962 R. E. KIBELE 3,026,678
AIRCRAFT HYDRAULIC SYSTEM
Filed Feb. 18, 1959 5 Sheets-Sheet 5

INVENTOR.
ROBERT E. KIBELE
BY
ATTORNEY

United States Patent Office 3,026,678
Patented Mar. 27, 1962

3,026,678
AIRCRAFT HYDRAULIC SYSTEM
Robert E. Kibele, Columbus, Ohio, assignor to
North American Aviation, Inc.
Filed Feb. 18, 1959, Ser. No. 794,184
3 Claims. (Cl. 60—52)

This invention relates generally to an aircraft hydraulic system and more particularly to an improved aircraft hydraulic system having high-efficiency operating characteristics.

In addition, this application is a continuation-in-part of my co-pending application for United States Patent Serial No. 699,225, filed November 27, 1957, now abandoned.

The aircraft hydraulic system of this invention utilizes conventionally designed hydraulic system components but additionally incorporates a novel regulating arrangement whereby the overall capabilities of the combined components are increased to a high magnitude. As will be noted, the pumps, actuators, distribution lines, valves, and the like that are utilized in the practice of this invention may be of typical aircraft hydraulic system component design. However, the means, methods, and design and operating standards provided for regulating operation of the system hydraulic components are of a superior nature and constitute the important aspect of this invention.

It is an object of this invention to provide an aircraft hydraulic system that periodically utilizes operating pressures which greatly exceed the continuous operating pressures typically associated with conventionally designed hydraulic systems utilizing comparable hydraulic components.

Another object of this invention is to provide an aircraft hydraulic system that efficiently handles peak system loadings which are of a transient nature.

Another object of this invention is to provide a high-efficiency hydraulic system for aircraft and the like wherein the output performance of the system is keyed to the output required of the system.

Another object of my invention is to provide an aircraft hydraulic system wherein increased output capability keying, relative to system loading, may be accomplished either as a step function or as a modulated function.

A further object of this invention is to provide an aircraft hydraulic system wherein, with reference to conventionally designed hydraulic system of equal capability, appreciable weight savings have been effected without sacrificing performance capability of the system.

Another object of this invention is to provide a hydraulic system which may be utilized in aircraft flight control systems and in other equally suitable aircraft applications.

Another object of this invention is to reduce the number of installation clearance problems typically associated with conventionally sized aircraft hydraulic systems when such are employed in high-density, high-performance aircraft.

Another object of this invention is to provide an aircraft hydraulic system which may advantageously utilize existing aircraft flight data sources for regulation of system operation.

A still further object of this invention is to provide an aircraft hydraulic system which has a high degree of operational reliability, which has minimum manufacturing costs as compared to conventionally designed hydraulic systems of comparable capability, and which requires a minimum of maintenance effort.

Other objects and advantages of my invention will become apparent during consideration of the drawings and detailed description portion of this specification.

In the drawings, wherein like numerals are utilized to reference like components throughout the same.

Figures 1, 3, 4:
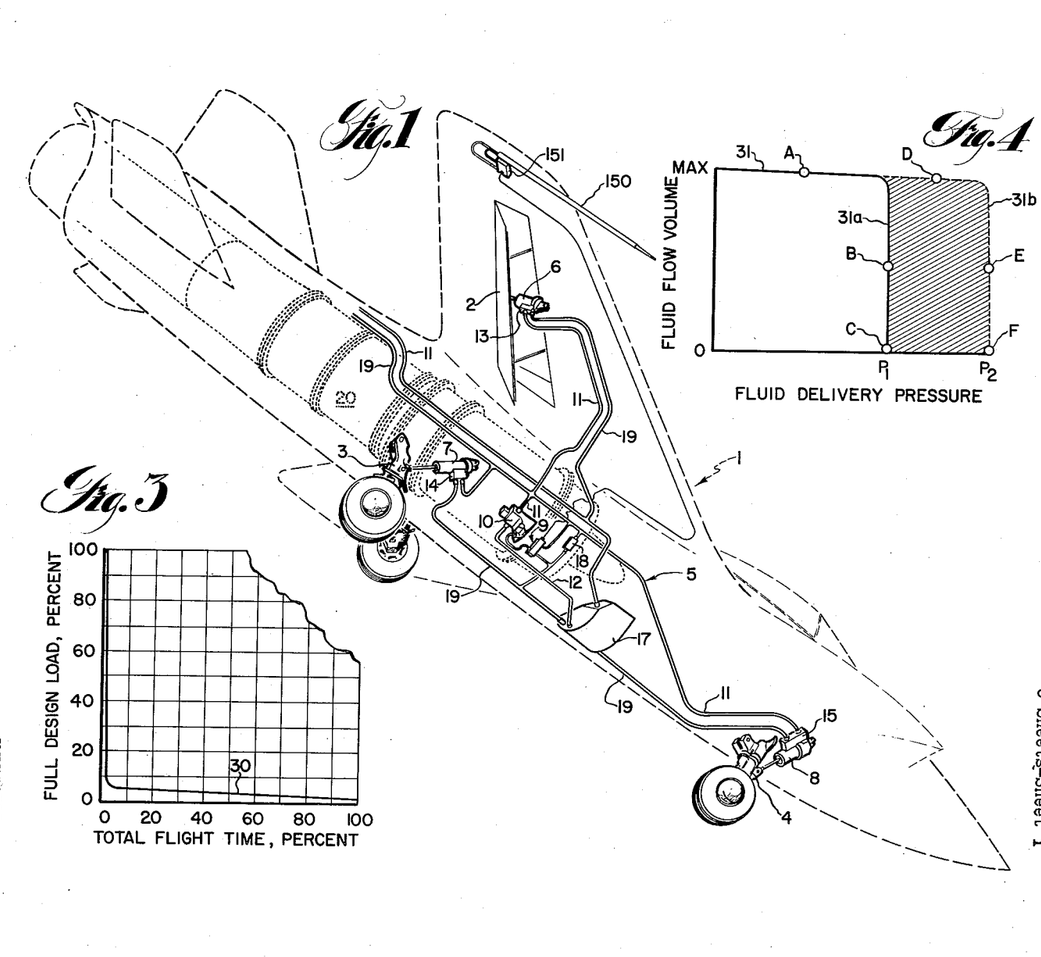
FIG. 1 is a perspective illustration of an airplane having a hydraulic system and incorporating the features of this invention therein in a preferred arrangement.
FIG. 3 is a typical time-load curve for the aircraft hydraulic system illustrated in FIGS. 1 and 2.
FIG. 4 illustrates a typical performance curve for the system of FIGS. 1 and 2.

FIG. 1 illustrates, in outline form, an airplane 1 having a typical spoiler-type control surface assembly 2 carried by structural components located in each wing member. In addition, airplane 1 includes a retractable main landing gear 3 extending from the underside of the airplane fuselage portion, and includes a retractable nose landing gear 4 positioned in a forward fuselage portion. Aircraft components 2, 3, and 4 are movably powered, as for extension or retraction, by the hydraulic system referenced generally as 5. System 5, which incorporates the features of this invention, is illustrated as being only in powering association with components 2, 3, and 4. However, system 5 can also be advantageously and operatively combined with other aircraft components such as hydraulically-powered horizontal stabilizers, speed brakes, fuselage doors, arresting hooks, and the like.

Figure 2:
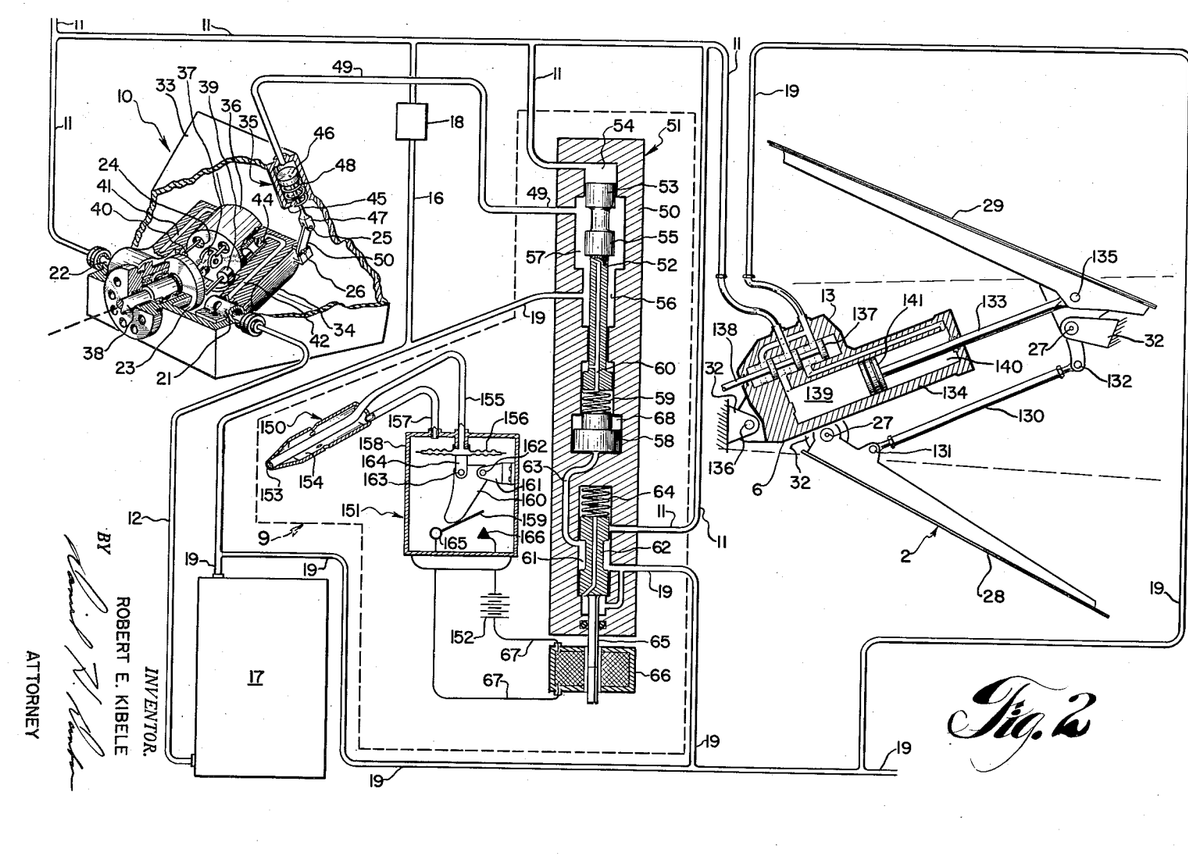
FIG. 2 is a partially-sectioned schematic illustration of the hydraulic system shown in FIG. 1 in cooperative combination with but one particular aircraft operating component.

System 5 also includes actuator members 6, 7, and 8 connected respectively to components 2, 3, and 4 to effect complete operation of such components. The actuator members 6, 7, and 8 are of conventional double-acting design; actuator 6 is schematically illustrated in FIG. 2. Hydraulic system 5 also includes a control portion referenced generally as 9 which is hereinafter described in greater detail, and which is utilized to provide system 5 with a high-performance capability.

Referring also to FIG. 1, hydraulic system 5 includes pump means 10, pressure distribution lines 11 connected to pump 10 at its discharge portion, and a suction line 12 connected to the intake portion of pump 10. The system is also provided with directional valve members 13 through 15 associated respectively with actuator members 6, 7, and 8. Valve members 13 through 15 are of a conventional design, and are each connected to a pressure line 11 and to a return line 19. Return lines 19 are in turn routed in fluid-conducting relation to the fluid reservoir referenced generally as 17. A typical relief valve means 18 is provided for safety purposes in a fluid-conducting line 16 which interconnects a distribution line 11 with a return line 19. FIG. 1 additionally illustrated the aircraft power plant 20 which is the prime mover or motivating source for the airplane 1 and for pump 10. It should be noted that pump means 10 might be alternatively powered by a separate engine or the like.

Additional details regarding the system of this invention are shown in FIG. 2. Pump means 10 is illustrated as being of the variable-volume type. Because such pumps are well-known in the art, complete details regarding a typical construction are not provided herein. However, the pump means portion of FIG. 2 does illustrate housing means 33, a yoke member 34 pivotally connected to housing 33 by journal bearing means 21 and 22, and the compensator assembly 35 which pivots yoke member 34 about the longitudinal axis of journal means 21 and 22. Cylinder block 36 rotates within yoke member 34 and is connected by universal joint means 37 to the drive shaft designated 38. One cross-axis of universal joint 37 must correspond to the longitudinal axis of journal means 21 and 22 to effect rotation of yoke member 34 relative to housing 33 and relative to the axis of drive shaft 38. Piston means 39 are contained in the separate cylinder portions 24 provided in the separate cylinder portions 24 provided in cylinder block 36, and are pivotally connected by rod means 40 to the drive hub designated 23. Hub 23 is attached to shaft 38 in direct drive relation. Passageway 41, provided in yoke member 34, connects a distribution chamber (not shown) in the head portion of member 34 adjacent block 36 with pressure line 11, and also passes through the journal means 22. Similarly, passageway 42 connects a separate distribution chamber 44 in the head portion of yoke member 34 adjacent cylinder block 36 with suction line 12, and also passes through the journal means 21.

Compensator assembly 35 is comprised of housing 45, piston means 46 in housing 45, compression spring means 48, and a rod member 47 connected to piston means 46 and extended through housing 45. Rod 47 is connected to link 50 by pin means 25, and link 50 is connected to yoke member 34 by the pin means designated 26. Movement of piston means 46 in one direction is caused by compression spring 48. Piston movement in the other direction is achieved by introducing pressurized hydraulic fluid into housing 45 through passageway 49. Such fluid must be pressurized sufficiently to overcome the compression forces of spring means 48. Spring 48 normally urges piston 46 to its FIG. 2 position to obtain the maximum pump delivery rate. However, fluid which has been sufficiently pressurized urges piston 46 and rod 47 downward to overcome spring 48. Through the link 50 connected thereto, rod 47 moves yoke member 34 and cylinder block 36 into an aligned position with respect to the axis of drive shaft 38.

Zero delivery occurs when the rotational axis of cylinder block 36 is aligned with the rotational axis of drive shaft 38 and drive hub 23. Piston means 39 do not then reciprocate with respect to cylinder portions 24 contained in cylinder block 36. Increased pump delivery is obtained by pivoting yoke member 34 from the aligned position to a position such as that illustrated in FIG. 2. Assuming clockwise rotation of drive shaft 38 and the elements connected thereto, as pistons 39 are moved from an uppermost position fluid is drawn into cylinders 24 from distribution chamber 44 and passageway 42. At a lowermost position, each cylinder portion is filled with a maximum amount of fluid. As pistons 39 are moved from a lowermost position to an uppermost position, the indrawn fluid is discharged into the separate distribution chamber provided in communication with passageway 41. Through use of a typical multi-piston arrangement, comparatively high delivery pressures are achieved. However, as will be hereinafter pointed out, the practice of this invention is not limited to the use of variable-volume type pumps. In the alternative, a constant displacement type pump means may be used in the aircraft hydraulic system of this invention.

FIG. 2 also illustrates details regarding spoiler assembly 2, actuator means 6, and the directional control valve 13. Control surface sub-assemblies 28 and 29 are connected by pin means 27 to bracket members 32. Each bracket member 32 is attached to wing structure of airplane 1. A connecting rod 130 is attached by pin means 132 to subassembly 29. Movable rod portion 133 of actuator means 6 extends from within actuator body portion 134 and is connected to sub-assembly 29 by pin means 135. Pin means 136 is provided to pivotally connect actuator body portion 134 to still another structural bracket 32 of airplane 1. A valve spool 137 has a stem portion 138 which projects outside the valve means housing. Stem portion 138 is connected to a mechanical linkage (not shown) and is movably controlled by an aircraft control stick or the like as in a conventional manner. Through the valve means and actuator means passageway arrangement schematically illustrated in FIG. 2, pressurized hydraulic fluid may be directed by valve spool 137 from supply line 11 into either chamber portion 139 or chamber portion 140. Such hydraulic fluid acts upon piston means 141 to positively move spoiler assembly surface components 28 and 29 about their pivot connections 27. When pressurized fluid is introduced into chamber 139 a corresponding volume of fluid is directed from chamber portion 140 into return line line 19, and piston means 141 moves the spoiler assembly against a load and to the FIG. 2 open position. By properly changing the position of valve spool 137, pressurized fluid may be directed from line 11 into chamber portion 140. Such action will positively cause spoiler assembly 2 to be returned to a closed condition from its FIG. 2 position. As previously noted, line 11 is connected to the high-pressure delivery side of pump means 10 and line 19 is connected to the low-pressure return reservoir 17. Other types of known actuator means may be employed in the practice of this invention, including actuator means having a form of follow-up control or having other operating characteristics.

As previously noted, hydraulic system 5 contains a generally referenced control portion 9. Control portion 9 is illustrated in greater detail within the dotted line portion of FIG. 2, and includes a regulator means 51 in combination with hereinafter described load-sensing means. However, in order that a better understanding of the construction and function of control means 9 might be obtained, several comments relating to overall characteristics of system 5 are provided.

The curve 30 of FIG. 3 illustrates the relation between the actual loading of aircraft hydraulic system 5 and the maximum load capacity of the system; the relation is expressed as a percent of the full design load and is plotted as a function of the percent of total flight time during which it occurs. From FIG. 3 it will be observed that the actual system load exceeds 10% of the system total load capacity substantially less than 5% of the total flight time. In fact, a 100% loading may exist as little as 0.04% of total flight time as in the case of a hydraulic sub-system provided for the actuator means connected to the horizontal stabilizer of a military, fighter-type airplane. In FIG. 3 the typical average loading on system 5 is indicated at the 100% total flight time value; as shown, the average actual loading may be as low as 2% of the designed total load capacity.

Because of this typical loading distribution, a cumulative damage stress theory can be utilized in designing hydraulic system 5. As related to system operation, the operating pressure levels of the system are substantially increased beyond an otherwise maximum continuous operating pressure level in a manner which does not reduce the expected life of system components to a value less than that initially designed for. The control arrangement 9 of this invention provides that such increased operating pressure levels will be obtained only when an actual need for such increased operating pressure levels is manifested by the system.

For instance, I have discovered that an aircraft hydraulic system designed for a nominal operating pressure of 3,000 pounds per square inch (p.s.i.) in accordance with the requirements of U.S. Government Military Specification MIL–H–5440B, May 25, 1955, may be operated with an upper working pressure limit of from 4,500 p.s.i. to 6,000 p.s.i. without shortening the expected life of the system and its components. In this application the term "design maximum continuous operating pressure level" has reference to the nominal operating pressure of an aircraft hydraulic system which powers one or more primary flight control surfaces such as the horizontal stabilizer referenced above in the discussion of the system loads distribution shown in FIG. 3 or such as the spoiler-type control surface 2 of FIG. 1 or the aerodynamic speed brake door 172 of FIG. 8; in terms of the requirements of Specification MIL–H–5440B, for instance, the nominal operating pressure of an aircraft hydraulic system is one-half the proof pressure value for system components such as lines, fittings, hose, and the like, and is one-fourth the burst pressure for such components. See Table I and paragraphs 3.12.33.1 and 3.12.33.2 of that specification, particularly with respect to installed system proof and burst pressure values. Such a system would normally have, if provided with a variable-volume pump, a pump unloading pressure of 3,000 p.s.i., an upper limit full-flow system pressure of 2,950 p.s.i., and a system relief valve setting at maximum system flow of 3,850 p.s.i. However, with the arrangement of my invention the components of this same system would be operated with an additional or secondary pump unloading pressure of from 4,500 p.s.i. to 6,000 p.s.i., with a secondary upper limit full-flow system pressure of approximately 50 to 75 p.s.i. less than the pump secondary unloading pressure, and with a system relief valve setting at maximum system flow of from approximately 1200 p.s.i. to 1700 p.s.i. above the secondary pump unloading pressure. However, such higher pressure levels are utilized only judiciously, and their use is correlated with the need therefor through proper regulation of the system by the control means referenced generally as 9.

The curve 31 of FIG. 4 further illustrates the operation of the hydraulic system of this invention. During load conditions which correspond to the near-horizontal portion of curve 30 of FIG. 3, system operation follows the curve portion 31a to the maximum continuous operating pressure level $P_1$. At a point such as A, system pressure is well-below the level $P_1$ and full fluid flow is realized. At point B the primary level $P_1$ is being approached and fluid flow volume is somewhat reduced. At point C the maximum continuous operating pressure level is obtained and fluid flow to the load ceases; however, system pressure is maintained at this level. The area under curve portion 31—31a is indicative of the primary or maximum continuous loading of hydraulic system 5.

The additional loading of system 5 may be carried out in accordance with the showing of curve portion 31b of FIG. 4. The shaded area noted in FIG. 4 represents the additional or secondary system capacity which is utilized only during those system conditions which relate to the near-vertical portion of curve 30 of FIG. 3. At point D flow is reinstated at a pressure level well in excess of $P_1$. At point E a second operating pressure level $P_2$ is approached and the flow of fluid to the system load is throttled downward. At point F the second operating pressure level $P_2$ is obtained and fluid flow to the load again ceases. Experience has established that in terms of conventional hydraulic system design practices, the pressure level represented by $P_2$ may range from 50% to 100% greater than the maximum continuous operating pressure level represented by $P_1$. Accordingly, this invention advocates that aircraft hydraulic system components be preferably designed with reference to continuous operation at level $P_1$ and with reference to standard component design concepts based on continuous operation at that level. It should be noted that curve portion 31b of FIG. 4 assumes that increased power is available from the prime mover of pump means 10. If only the same power as is associated with curve 31—31a is available, the horizontal portion of curve 31b will drop to a lower value.

Referring again to FIG. 2, control means 9 is illustrated as including regulator means 51, and the load-sensing means comprised of Pitot tube means 150, pressure-responsive switch assembly 151 connected to the Pitot tube means, and an appropriate electrical circuit connecting regulator means 51 to pressure-responsive switch assembly 151 and to a source of electrical energy 152. Contained within body portion 50 of regulator means 51 is a pressure responsive control element 52 which has the form of a slidable valve spool means. Piston portion 53 of element 52 cooperates with interior chamber portion 54; piston portion 55 thereof cooperates with chamber 56 when the element 52 is moved away from its FIG. 4 position by pressurized fluid introduced into chamber 54. Chamber portions 54 and 56 are joined by a chamber portion 57 of enlarged diameter. Also, chamber portion 54 communicates with system supply line 11 and chamber portion 56 communicates with return line 19 in the manner illustrated. A separate piston means 58 is movably associated with valve spool means 52 through the compression spring designated 59. Passageway 60 is provided within valve spool means 52 and provides continuous fluid communication between chamber portions 56 and 68. Chamber 68 is provided to contain spring means 59 and to receive a portion of piston member 58. A valve spool means 62 is located in chamber portion 61 and is provided to control the admission of pressurized hydraulic fluid through passageway 63 for moving piston means 58. As illustrated, passageway 63 continuously connects chamber portion 68 (at the lower face of piston 58) to chamber portion 61. Spring means 64 is provided in chamber 61 at one end of valve spool means 62 to maintain valve spool means 62 in its normal (FIG. 2) position. Rod portion 65 is connected to valve spool means 62 and extends outside body portion 50. The end portion of rod 65 projects into the hollow interior of solenoid means 66 and is moved upward to compress spring means 64 when the solenoid 66 is energized. Leads 67 connect solenoid 66 to the illustrated electrical circuit which energizes the solenoid in response to the establishing of a hereinafter described electrical demand signal. Chamber portion 61 communicates with lines 11 and 19 in the manner illustrated. Also, details regarding the operation of regulator means 51 will be hereinafter described.

Pitot tube means 150 and pressure-responsive switch assembly 151 are provided in control portion 9 to obtain a demand signal which is indicative of actual increased loading in connection with the aircraft operating components of airplane 1. In the form shown, a demand signal is generated in response to the establishing of a specified value of dynamic pressure ("$q$") during flight operations of airplane 1. Dynamic pressure is here defined as the pressure differential which exists between air speed pressure and static pressure; such differential is commonly expressed in the dimension of pounds per square foot.

Conventional Pitot tube means 150 has an open-ended, hollow, sensing portion 153 which continuously obtains an air speed pressure, and has a perforated, annular, sensing portion 154 which continuously obtains a static pressure condition. Such pressure conditions are associated with the flight of airplane 1. Tube means 155 connects Pitot portion 153 with the interior of sealed diaphragm element 156. A tube element 157 connect static pressure, sensing portion 154 with the sealed interior of housing 158. Contained within housing 158 is switch means 159, a cam means 160 connected to support 161 by pin means 162, and a pin means 163 which connects the stud 164 attached to diaphragm 156 to cam means 160. Switch means 159 may be of a miniaturized, normally-open, pressure-sensitive, snap-action type. When a proper "$q$" value is sensed by Pitot means 150, diaphragm 156 is sufficiently expanded whereby stud means 164 rotates cam 160 about pin 162 and causes switch means 159 to complete an electrical circuit across contact points 165 and 166. As a result, energy from source 152 is conducted through leads 67 to energize solenoid 66.

Operation of system 5 may be described with reference to hydraulic components having a conventional full design load at a 3,000 p.s.i. maximum continuous operating pressure level. The elements of regulator means 51 are preferably sized such that at 3,000 p.s.i., valve spool 52 is moved to downward from its position shown in FIG. 2 by pressures transmitted to chamber portion 54 through the line 11 associated therewith. During this phase of the system's operation, piston 58 is located at its FIG. 2 position because passageway 63 is made to communicate with a low pressure return line 19 through chamber 61. The 3,000 p.s.i. pressure acting on piston portion 53 causes spring 59 to be compressed sufficiently whereby a fluid passageway is provided between chamber portions 54 and 57; the fluid passageway between chamber portions 56 and 57 is simultaneously therewith closed by piston portion 55. In consequence, passageway 49 becomes pressurized and compensator piston 46 and yoke member 34 will each be moved toward an unloading position.

Thereafter, upon energization of solenoid 66 by a demand signal, spool means 62 is moved upward from the position shown in FIG. 2 to place passageway 63 in communication with line 11 through chamber 61. This greatly increases the pressure acting on piston 58 and moves that member, spring 59, and spool 52 upward; in consequence, spool 52 is moved to a position similar to that presently shown in FIG. 2. Passageway 49 again communicates with a low-pressure return line 19 through chamber portions 56 and 57. Compensator piston 46 will then be returned to its load position by spring means 48.

Further increasing of system operating pressures on a step function basis, as in accordance with the curve portion 31b of FIG. 4, causes additional compression of spring 59 my moving spool 52 downward as from its position shown in FIG. 2. At a secondary operating pressure level, say 4,500 p.s.i., valve spool means 52 is moved against spring 59 a sufficient distance to again place passageway 49 in communication with the line 11 associated with chamber 54.

Figure 5:
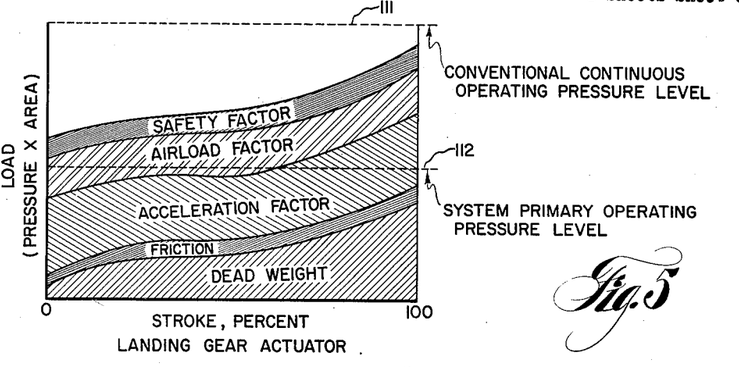
FIG. 5 illustrates a typical load-stroke curve for the actuator means connected to the landing gear illustrated in FIG. 1.

To provide additional insight with respect to the aircraft hydraulic system of this invention, reference is made to the load-stroke diagram illustrated in FIG. 5. In this diagram, which may be considered typical of load-stroke design diagrams for aircraft landing gear actuators, the "Dead-weight" and "Friction" shaded areas are indicative of hydraulic loadings which will be encountered at all times during completion of a full stroke of the actuator. On the other hand, the "Acceleration," "Air Load," and "Safety Factor" loadings may be considered as problematical loadings; such factor loadings must be provided for at their maximum anticipated cumulative value at each instance of the entire actuator stroke even though they most often may be of a small or insignificant actual value.

Conventional design practice has heretofore dictated that a continuous operating pressure level 111 be selected for design and operation of a landing gear actuator. As noted in FIG. 5, the allowed-for load level is placed somewhat above the maximum cumulative design loading (which occurs at the 100% stroke abscissa value) to allow for incidental system pressure losses such as those caused by fluid flow. This maximum value is also indicative of the hydraulic force available throughout the stroke of the actuator because the actuator piston and cylinder cross-section areas and the available operating pressure remain constant throughout the entire stroke.

However, the system of this invention advocates that a primary operating pressure level 112 be selected for near-continuous use during normal or routine flight operations. In absolute terms, pressure level 112 is made to correspond to the conventionally-selected pressure level 111 in value. Accordingly, the cylinder and piston cross-section areas (as well as other system components) may be made proportionally smaller and yet provide for equivalent load-handling capability. It must be again pointed out that the system of this invention also utilizes a secondary operating pressure level, such as at pressure level 111 of FIG. 5 or 113 of FIG. 6, to provide system capability with respect to the actual existence of the hereinbefore noted problematical loadings.

For example, a landing gear actuator required to provide a 12,000 pound force capability may conventionally utilize a 3,000 p.s.i. fluid pressure continuously in combination with a 4 square inch piston area. However, if the 3,000 p.s.i. maximum continuous operating fluid pressure is utilized with respect to say just 9,000 pounds of the required force capability (to provide for dead-weight and friction loadings and only a small portion of the problematical loadings) the actuator may be provided with only a 3 square inch piston area. In accordance with the operating standards hereinbefore described with respect to my invention, the system pressure may be judiciously increased to 4,500 p.s.i. (to more than provide for system capability with respect to the balance of said problematical loadings) to thereby increase the maximum actual loading to over the aforementioned 12,000 pound force required. It is important to point out that such secondary pressure level is utilized only in response to a demand signal which is indicative of an actual need for the higher pressures and that, with respect to aircraft applications, the frequency of occurrence of such peak loadings is sufficiently low that the fatigue life of the actuator and other system components is not foreshortened materially.

Figure 6:
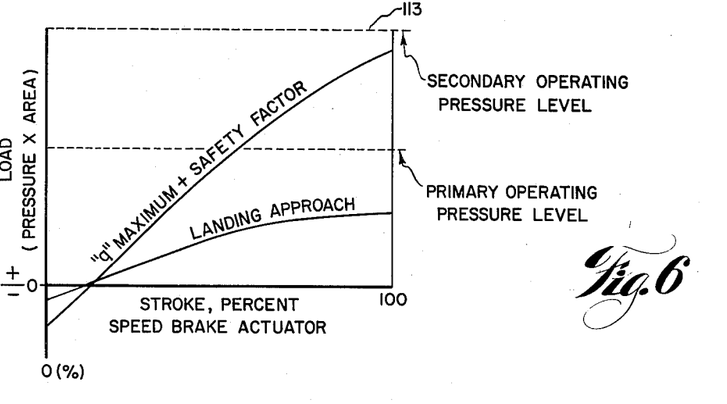
FIG. 6 illustrates a typical load-stroke curve for an actuator means connected to an aircraft operating component such as a conventional speed brake means.

As an alternate example, reference may be made to the speed brake actuator load-stroke curve of FIG. 6. In this diagram the "Landing Approach" line represents the actual loading which typically occurs most frequently during aircraft flight operations, whereas the curve designated " "$q$" Maximum +Safety Factor" is indicative of the loading capability which must be provided to handle the infrequently (or even never-simultaneously) occurring maximum velocity, acceleration, altitude, and temperature conditions. As with respect to the aforesaid landing gear actuator, substantial weight savings may be effected in a speed brake actuator system through the judicious selection of operating pressure levels.

For instance, if the speed brake actuator requires a 13,5000 pound force output during high-performance flight maneuvers, a conventionally designed sub-system may utilize a maximum continuous operating pressure of 3,000 p.s.i. with an actuator piston area of 4.5 square inches. However, if the 3,000 p.s.i. pressure is selected as the near-continuous primary operating pressure level 112 and the piston area reduced to 3 square inches, the resulting 9,000 pound force capacity will, in all likelihood, suffice for operating the speed brakes during typically encountered landing approaches. During periods of demand, the system pressure may be increased to 4,500 p.s.i. if necessary to provide the maximumly required 13,500 pound force output. Again, substantial weight savings may similarly be effected in other system components (pump, lines, valves, and the like) without substantially altering the expected operating life of such components in terms of useful life of the aircraft. Such is possible because of the infrequent occurrence of the transient peak loading which calls for use of a secondary operating pressure level such as that designated by 113 in FIG. 6.

Figure 7:
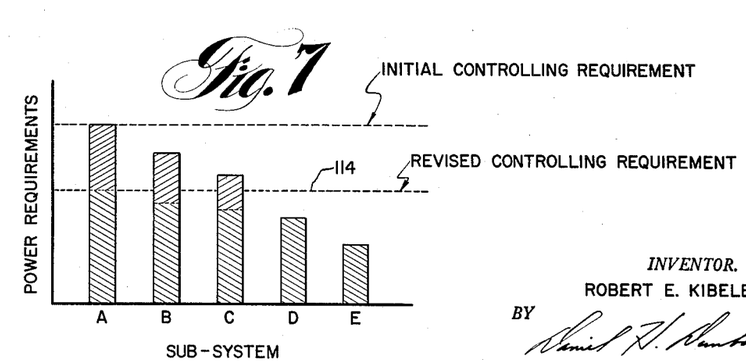
FIG. 7 is a bar chart showing the relation between the total power requirements of an aircraft hydraulic system and the power requirements of sub-system portions thereof.

FIG. 7 is provided to show the relationship between the power requirements of an aircraft hydraulic system and its various sub-system portion A through E. In terms of the overall height of each bar, it is to be noted that sub-system A requires more power than any other sub-system. As long as sub-system A controls the power requirements for the entire system, it is responsible for the weight of the power supply component as well as for its own sub-system weight. If sub-system A power requirements are reduced to the power requirement level designated by the line 114, by the use of my invention, the overall power requirement of sub-system B then dictates the system power supply and weight requirements. By a like application of this invention to sub-system B, the power requirement of sub-system C may next become the controlling requirement. Accordingly, very substantial weight savings may be effected in an entire hydraulic system by application of the invention described herein to each of the sub-system portions.

Alternate embodiments of aircraft hydraulic systems incorporating the features of this invention are illustrated by FIGS. 8 through 11. The systems of FIGS. 8 and 9 utilize a demand signal which is electrical in nature; however, the load-sensing means provided therein for obtaining the proper demand signal differ in each system and differ from the load-sensing means provided in aircraft hydraulic system 5 (FIGS. 1 and 2) for a like purpose. The systems shown in FIGS. 10 and 11 incorporate load-sensing means for establishing a demand signal which is hydraulic in nature. Further, the system of FIG. 11 differs from the system of FIG. 10 in that a constant-displacement type pump means is incorporated therein rather than a variable-volume pump.

Figure 8:
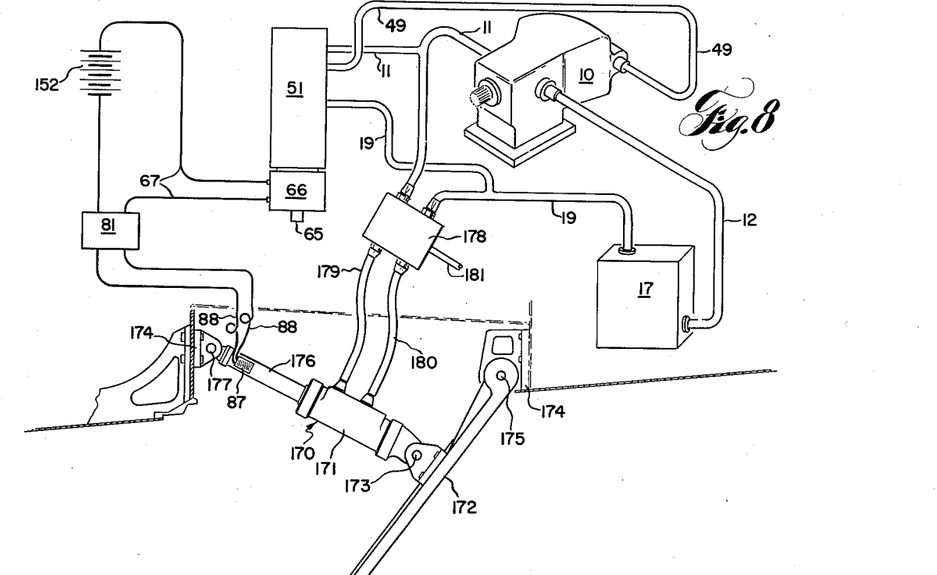
FIG. 8 is generally similar to FIG. 2, but schematically illustrates another component arrangement which obtains the objects and advantages of my invention.

Referring to FIG. 8, actuator means 170 is conventional in design and has its body portion 171 connected to aircraft operating component 172 by hinge means 173. Component 172, which is illustrated as having the form of a speed brake door, is pivotally connected to an airplane structural bracket 174 by pin means 175. Relatively movable rod portion 176 of actuator means 170 is connected to another structural bracket 174 by the pin designated 177. Directional valve means 178 is similar in form and function to valve means 13, 14, or 15 in FIG. 1. However, means 178 is separated from actuator means body portion 171 but is connected thereto in fluid-conducting relation by fluid lines 179 and 180. A valve member stem portion 181 projects from within valve means 178 and is connected to a linkage or the like (not shown) typically provided for obtaining directional control in a conventional manner. A relief valve means, such as 18 of FIG. 1, is preferred in the system but not illustrated in FIG. 8. Attached to rod portion 176 by a suitable adhesive is a resistance-type strain gage designated 87. Leads 88 connect strain gage 87 to the conventional detector-amplifier designated 81.

The operation of the system of FIG. 8 is substantially the same as the operation of heretofore described aircraft hydraulic system 5. However, components 87 and 81 function as a load-sensing means to obtain a demand signal similar to that generated by the Pitot tube means 150 and the pressure-responsive switch assembly 151 of FIGS. 1 and 2. When the load acting upon surface 172 becomes sufficiently large that the primary operating pressure established by regulator means 51 is not completely effective, further increased strains in rod portion 176 are sensed by strain gage means 87. The decreased amplitude of the strain signal is detected in amplifier 81 and a resultant signal above a threshhold value is utilized to complete an electrical circuit through source 152 and leads 67 and thereby energize solenoid 66. Such results in system regulator means 51 establishing the heretofore described secondary operating pressure level in the system. When the actual load on surface 172 and rod portion 176 is subsequently decreased, strain gage means 87 senses the change and if sufficiently great the demand signal transmitted by amplifier 81 is cut off. The system then returns to its preselected primary operating pressure level.

Figure 9:
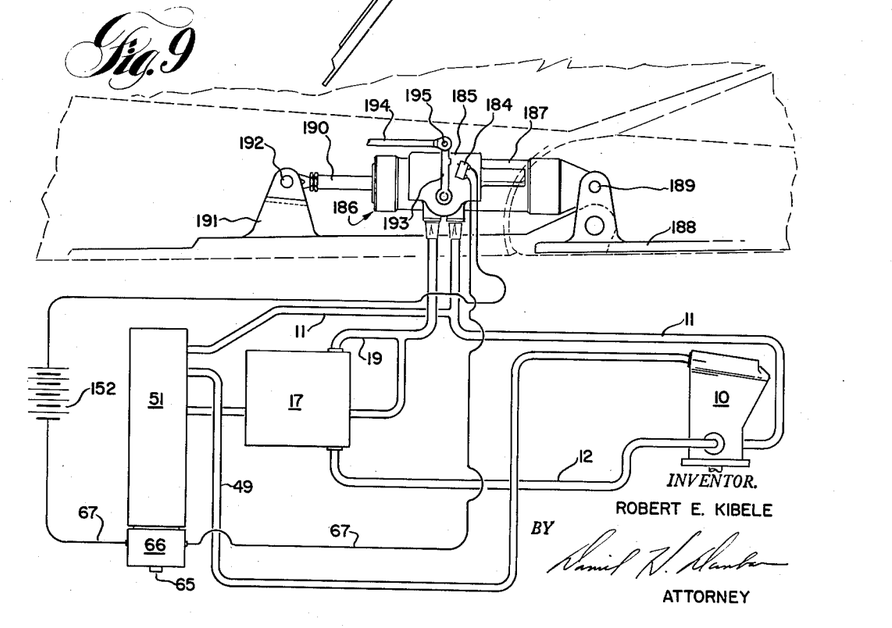
FIG. 9 is also generally similar to FIG. 2, but illustrates still another hydraulic system component arrangement obtaining the advantages of this invention.

In the FIG. 9 system, the load-sensing means demand signal is established at the switch means 184 that is provided in attached relation to the body portion of valve means 185. Actuator means 186 has a body portion 187 connected to airplane control surface 188 by hinge means 189. Rod portion 190 of the actuator means is connected to airplane structural bracket 191 by pin means 192. Also, actuator means 186 is illustrated as a conventional type unit having an attached directional valve means 185 that provides for typical aircraft follow-up control. The valve means is provided with an actuating arm 193 that is connected at one extreme to an internally located valving member and connected at an opposite extreme to link 194 by pin means 195. Link 194 is connected to a pilot's control stick or the like through an appropriate linkage (not shown). Switch means 184 is preferably of a miniaturized, normally-open, pressure-sensitive, snap-action type, and is actuated by the arm 193 provided for the directional valve member of valve means 185.

Referring to FIG. 9 and assuming that surface 188 has been pivoted clockwise and that body portion 187 has been moved rightward a corresponding degree, increased loads acting on surface 188 which are not adequately met by the primary operating pressure established by regulator means 51 will cause surface 188 to pivot counter-clockwise and will cause actuator body portion 187 to be moved leftward with respect to linkage 194. Such action in turn causes arm 193 to be rotated clockwise with respect to valve means 185 and toward engagement with switch means 184. If the then-established pressure is inadequate to return the control surface to its desired position, arm 193 will be moved into engagement with switch means 184. When the electrical circuit therethrough is completed, solenoid 66 and regulator means 51 will establish the heretofore-mentioned secondary operating pressure level in the system. As a result, the increased fluid pressure will move body portion 187 and control surface 188 to their desired position and thereby cut off the demand signal. A conventional dampening means may be required to prevent an oscillating on-off action in operating regions immediately adjacent the change-over zone.

Figure 10:
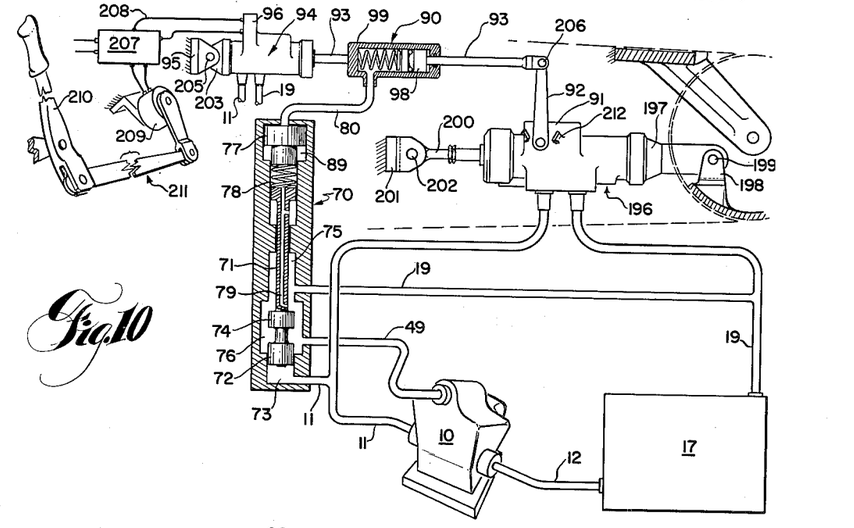
FIG. 10 is similar to FIG. 2 but illustrates this invention as utilizing a load-sensing device which obtains a demand signal of a hydraulic nature rather than of an electrical nature to provide a modulated increased pressure output rather than a pressure output that is a step function.

In the system arrangement of FIG. 10, actuator means 196 has a body portion 197 connected to bracket 198 by the pin means designated 199. Bracket 198 is attached to an aircraft operating component (not shown) which may take the form of a pivotable control surface or the like. A relatively movable rod portion 200 is provided in actuator means 196 and is connected to an airplane structural bracket 201 by pin means 202. Actuator means 196 has conventional features and has the same basic construction and basic operating characteristics as are described in connection with actuator means 186. Further, actuator means 196 is provided with a directly associated valve means 91 having actuating arm 92 extended therefrom. Arm 92 is similar in function to arm 193 described in connection with FIG. 9. A servo actuator means 94 is provided to rotatably power actuating arm 92 relative to the body portions of components 91 and 196. In the FIG. 10 form, servo actuator means 94 has a body portion 203 connected to supporting airframe bracket 95 by the pin means designated as 205. Rod portion 93 of servo actuator means 94 is connected to actuating arm 92 by the pin connection 206, and includes a hydraulic load-sensing means 90 which transmits a demand signal into passageway 80. With respect to a typical servo actuator means 94, it should be noted that the directional valving member (not shown) provided in attached valve means 96 utilizes a variable electric signal received from integrating amplifier 207 to properly port hydraulic fluid through actuator means 94 and from and to lines 11 and 19 to thereby control extension and retraction of rod portion 93 relative to body portion 203. Electrical circuit 208 connects valve means 96 to integrating amplifier 207. Unit 207 typically receives electrical input signals from several sensing sources, including the potentiometer means 209. Potentiometer 209 is controlled by pilot's control stick 210 through the interconnecting mechanical linkage referenced generally as 211.

Also included in the FIG. 10 system is regulator means 70. This system portion functions similarly to previously described regulator means 51. However, means 70 utilizes a proportionally modulated hydraulic demand signal generated at load-sensing means 90, rather than an on-off electrical signal developed for use with regulator means 51. Regulator means 70 includes a control member 71 having piston portions 72 and 74 that respectively cooperate with chamber portions 73 and 75 during reciprocation of member 71. Chamber portions 73 and 75 are joined by a chamber portion 76 of larger cross-section. Chamber portion 73 is connected in fluid-conducting relation to a pressure line 11, and chamber portion 75 is connected in a like manner to a return line 19. Chamber portion 76, on the other hand, communicates with the line component designated 49. A piston means 77 is contained in chamber portion 89 and is separated from control member 71 by compression spring means 78. Passageway 79 functions in the manner of passageway 60 of previously described control member 52. Load-sensing means 90 includes a piston portion 98 connected to one portion of rod 93, and a spring means 99 which maintains piston 98 in its FIG. 10 position relative to the housing portion of load-sensing means 90 connected to the other portion of rod 93 during operation of the system at the established primary operating pressure level. Also, a check valve means (not shown) may be provided in a line connecting passageway 80 to a supply line 11 to maintain load-sensing means 90 in a fluid-filled condition but yet prevent the flow of fluid therefrom into the system.

Referring to FIG. 10, when the system primary operating pressure level is obtained, fluid is transmitted from line 11 through chamber portions 73 and 76 and into line portion 49 to unload pump means 10. Assuming that actuator means body portion 197 has been moved rightward, those increased loads of a transient nature which act upon body portion 197, and which are not adequately met by the primary operating pressure will cause that body portion to be moved leftward with respect to rod component 93. Such action in turn causes arm 92 to be rotated clockwise with respect to valve means 91 and toward engagement with the integral stop referenced as 212. If the then-established pressure is insufficient to return the aircraft operating component to its desired position, actuating arm 92 will contact stop means 212 and subsequently cause fluid in pressure load-sensing means 90 to be further pressurized. The resulting increased pressure condition is transmitted through passageway 80 into chamber portion 89 to move piston means 77, spring 78, and control member 71 downward. Such action returns control member 71 to a load position and the pressure established by pump means 10 is increased to the secondary operating pressure level. When the increased load condition subsides, rod portion 93 will return to its natural length and the demand signal established by the load-sensing means 90 is thereby cut off.

Figure 11:
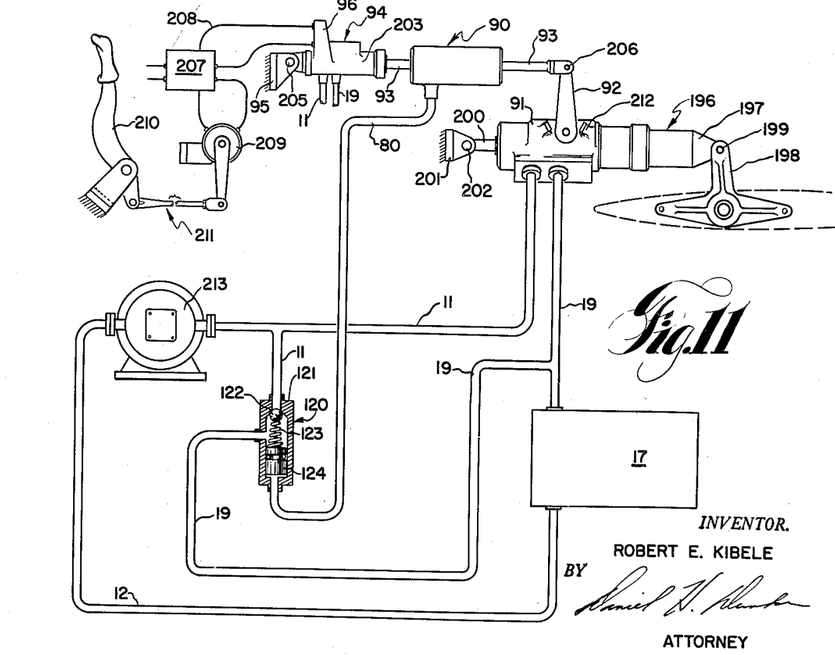
FIG. 11 is similar to FIG. 10, but shows a variation of this invention wherein the pump means incorporated into the system is of the constant displacement type rather than of the variable volume type.

Referring to the system illustrated in FIG. 11, a variable pressure relief valve means 120 is utilized as a combination unloading means and regulator means for the constant-displacement type pump designated 213. Valve means 120 is comprised of a body portion 121, a ball check 122, a compression spring means 123, and piston portion 124 contained in the chamber designated 125. Chamber portion 125 is connected at one side of piston means 124 to passageway 80, and at the other side of piston means 124 to pressure line 11 and to return line 19. Ball check 122 normally prevents the circulation of fluid from line 11, through chamber 125, and to low-pressure line 19. Spring means 123 is designed to maintain ball means 122 in its FIG. 11 seated position at system pressures up to and including the establishd primary operating pressure level. In the absence of a demand signal generated at load-sensing means 90, fluid will flow from line 11 through chamber 125 and into line 19 when the primary operating pressure level is attained by the system. When a demand signal is initiated in load-sensing means 90 by a transient peak loading transmitted through bracket 198 to actuator means body portion 197, piston means 124 is moved upwardly from its FIG. 11 position to compress spring 123 and reseat ball check 122. This results in an increased operating pressure in the system. When the demand signal ceases because the transient peak loading no longer exists, the system pressure is returned to its near-continuous primary level through the basic unloading function of valve means 120.

From this detailed description it will be noted that my invention constitutes a highly efficient form of hydraulic system for aircraft applications and the like. Through use of this invention numerous advantages can be realized: increased system capacity can be effected without reducing the service life of the system's components and without re-designing its hydraulic components; weight savings can be realized through the use of smaller sized components in hydraulic systems incorporated in high-performance aircraft having increased transient or peak hydraulic loadings; use of comparatively small size components in such aircraft will reduce installation clearance problems and will facilitate design of other aircraft components; the use of flow and pressure modulation judiciously, increases the performance efficiency of the hydraulic system components.

It is to be understood that the forms of the invention herein shown and described are to be taken as preferred embodiments of the same, but that various changes in the shape, size, and selection of parts may be resorted to without departing from the spirit of the invention or the scope of the subjoined claims.

I claim:

1. In an airplane which has an aircraft hydraulic system for powering operating components that include at least one primary flight control surface and having a design maximum continuous operating pressure level: hydraulic actuator means connected to said operating components, a variable-volume pump connected to said actuator means in powering relation, regulator-unloader means operably connected to said variable-volume pump to limit the operating pressure of said variable-volume pump at a first operating pressure level which corresponds to said system design maximum continuous operating pressure level and to increase the operating pressure of said variable-volume pump to a secondary operating pressure level which is substantially greater than said first operating pressure level, and load-sensing means operably connected to said regulator-unloader means and capable of detecting time-separated transient loads which are imposed upon said primary flight control surface and which are at a pressure-related level that is above said system design maximum continuous operating pressure level, said regulator-unloader means limiting the operating pressure of said variable-volume pump to said first operating pressure level when said load-sensing means fails to detect one of said transient loads and increasing the operating pressure of said variable-volume pump to said pump means secondary operating pressure level when said load-sensing means detects one of said transient loads.

2. The invention defined by claim 1, wherein said regulator-unloader means includes a first movable control component which limits the delivery pressure of said variable-volume pump when at one position to a pressure level that corresponds to said first operating pressure level and which causes an increase in the delivery pressure of said variable-volume pump when at another position, and includes a second movable control component which is operably connected to said first movable control component and which moves said first movable control component towards said another position when energized, said load-sensing means energizing said second movable control component when detecting one of said time-separated transient loads imposed upon said primary flight control surface and increasing said variable-volume pump delivery pressure to a secondary operating pressure level which is approximately 50% to 100% above said system design maximum continuous operating pressure level.

3. In combination with an airplane having primary flight control surfaces and having an aircraft hydraulic system for powering said primary flight control surfaces: hydraulic actuator means operably connected to said primary flight control surfaces, a continuously-driven variable-volume pump delivering pressurized hydraulic fluid, line and fitting means connecting said pump means in fluid-powering relation, a first control means component which limits pump delivery pressure to a nominal operating pressure that is approximately one-fourth the burst pressure of said line and fitting means when moved to a first position by pressurized hydraulic system fluid and which causes an increase in pump delivery pressure when moved to a second position from said first position, a second control means component which moves said first control means component to said second position when initially energized, load-sensing means which emits a demand signal in response to detected loads imposed on said primary flight control surfaces at pressure-related levels in excess of said nominal operating pressure, and separate means operably connected to said load-sensing means and to said second control means component and energizing said second control means component in response to demand signals emitted by said load-sensing means to thereby move said first control means component to said second position, said first control means component increasing the delivery pressure of said pump to above said nominal operating pressure in response to energization of said second control means component by said separate means, and said first control means component overriding said second control means component and said separate means when the delivery pressure of said variable-volume pump is increased to a pressure that is 50% to 100% above said nominal operating pressure.

References Cited in the file of this patent

UNITED STATES PATENTS

| | | |
|---|---|---|
| 2,391,896 | Hanson | Jan. 1, 1946 |
| 2,550,529 | Carson et al. | Apr. 24, 1951 |
| 2,552,604 | Thoma | May 15, 1951 |
| 2,626,670 | Moore | Jan. 27, 1953 |
| 2,696,355 | Larson et al. | Dec. 7, 1954 |
| 2,892,312 | Allen et al. | June 30, 1959 |

OTHER REFERENCES

Military Specification MIL–H–5440B Hydraulic Systems, May 25, 1955.